United States Patent
Kamae et al.

(10) Patent No.: US 6,410,127 B1
(45) Date of Patent: Jun. 25, 2002

(54) EPOXY RESIN COMPOSITIONS, EPOXY RESIN COMPOSITIONS FOR FIBER-REINFORCED COMPOSITE MATERIALS, AND FIBER-REINFORCED COMPOSITE MATERIALS COMPRISING THE SAME

(75) Inventors: Toshiya Kamae; Hiroki Oosedo; Shunsaku Noda; Shinji Kouchi; Ryuji Sawaoka, all of Ehime (JP)

(73) Assignee: Toray Industries, Inc., Tokyo (JP)

(*) Notice: Subject to any disclaimer, the term of this patent is extended or adjusted under 35 U.S.C. 154(b) by 0 days.

(21) Appl. No.: 09/700,180

(22) PCT Filed: Mar. 10, 2000

(86) PCT No.: PCT/JP00/01462

§ 371 (c)(1),
(2), (4) Date: Nov. 13, 2000

(87) PCT Pub. No.: WO00/53654

PCT Pub. Date: Sep. 14, 2000

(30) Foreign Application Priority Data

Mar. 11, 1999 (JP) .............................. 11-065299

(51) Int. Cl.[7] .............................. B32B 27/04
(52) U.S. Cl. .................... 428/297.4; 428/367; 428/413; 523/466; 523/468; 528/120; 528/122; 528/124; 528/407; 528/418; 528/421
(58) Field of Search ................. 523/466, 468; 528/120, 122, 124, 407, 418, 421; 428/367, 413, 297.4

(56) References Cited

U.S. PATENT DOCUMENTS 4,366,108 A * 12/1982 Urech ........................ 264/137

OTHER PUBLICATIONS

Liu, Curing Kinetics, J. Applied Poly. Science, 70(10), pp. 1991–2000, 1998.*

* cited by examiner

Primary Examiner—Robert Dawson
Assistant Examiner—D. Aylward
(74) Attorney, Agent, or Firm—Morrison & Foerster, LLP

(57) ABSTRACT

An epoxy resin composition having a low viscosity around a room temperature and excellent reinforcing fiber impregnating properties provides a composite material having excellent heat resistance and mechanical properties including compressive strength. The epoxy resin composition includes an aromatic epoxy resin having at least di-functionality, an aromatic amine compound and/or an alicyclic amine compound, wherein 5 minutes after the main agent comprising the epoxy resin and the curing agent comprising the aromatic amine compound and/or the alicyclic amine compound are mixed, the composition shows a viscosity at 25° C. in the range of from 1 to 1500 mPa sec, and Tc, tc, and Tg satisfy the following equation (1):

$$Tg \geq Tc + 20 - k \times (Tc - 90) \quad (1),$$

wherein $k=0$ when $60 \leq Tc < 90$ and $k=0.35$ when $90 \leq Tc \leq 200$;

Tc is the highest temperature (°C.) during the curing process and is defined by the formula $60 \leq Tc \leq 200$;

tc is the retention time (min) at the highest temperature and is defined by the formula $1 \leq tc \leq 120$; and Tg is the glass transition temperature of the epoxy resin composition after a lapse of tc (min) at Tc (°C.).

19 Claims, No Drawings

EPOXY RESIN COMPOSITIONS, EPOXY RESIN COMPOSITIONS FOR FIBER-REINFORCED COMPOSITE MATERIALS, AND FIBER-REINFORCED COMPOSITE MATERIALS COMPRISING THE SAME

TECHNICAL FIELD

The present invention relates to epoxy resin compositions. More particularly it relates to an epoxy resin composition for a fiber-reinforced composite material which has a low viscosity and can be easily handled for impregnating reinforcing fibers, and the resulting fiber-reinforced composite materials obtained after the composition is cured has excellent heat resistance and mechanical properties including compressive strength, and to the fiber-reinforced composite materials obtained therefrom.

BACKGROUND ART

As fiber-reinforced composite materials comprising reinforcing fibers and matrix resins are lightweight and have excellent mechanical properties, they have been widely used in various fields including aerospace, sports and general industrial fields.

A thermosetting resin is predominantly employed for the matrix resin of the fiber-reinforced composite. Among them, an epoxy resin having excellent heat resistance, high elastic modulus and good chemical resistance, as well as a little curing shrinkage is most commonly employed.

For producing fiber-reinforced composite materials, various methods, such as prepreg method, hand lay-up method, filament winding method, pull-trusion method, and RTM (resin transfer molding) method have been employed.

Among them, the RTM method, in which a preform comprising reinforcing fibers is placed in a mold, and a resin is poured thereinto to impregnate the preform and cured to produce a molded product, has a great advantage that a large component having a complicated shape can be molded in a short time.

The resin for use in RTM method needs to have a low viscosity to facilitate the impregnation of the preform. If the viscosity of the resin is high, a longer time is required for injection, which may result in a low productivity or provide unimpregnated portions of the obtained fiber-reinforced composite materials. In the RTM method, the viscosity of the resin can also be lowered by raising the temperature of the resin, however, in the case of molding a large component, the entire mold must be heated, therefore it is greatly disadvantageous from the viewpoint of the facility and the required energy. Furthermore, the curing of the resin may be progressed by the heat during the injection process, which may result in an increase of the viscosity of the resin. Therefore, a resin requiring no heating and having a sufficiently low viscosity around the room temperature has been strongly desired.

As the thermosetting resin for use in the RTM method, epoxy resins are often employed. In addition to that, thermosetting resins for use in the RTM method include unsaturated polyester resins, vinyl ester resins, and phenol resins etc. Many of these unsaturated polyester resins, vinyl ester resins and phenol resins have low viscosities around the room temperature, therefore show good injection workability around the room temperature, however, epoxy resins are desirable to provide fiber-reinforced composite materials having excellent heat resistance and mechanical properties and to reduce the polymerization shrinkage during the curing reaction.

Unfortunately all the epoxy resins are either those having good heat resistance or mechanical properties of the resulting fiber-reinforced composite materials, but poor injection workability around the room temperature due to its high viscosity, or those having good injection workability due to its low viscosity at the room temperature but insufficient heat resistance or mechanical properties of the resulting fiber-reinforced composite materials, therefore when good heat resistance and mechanical properties are required for the molded product, the epoxy resins must be heated and employed in the RTM method. In the publication of Japanese Patent Laid-Open Hei 6-329763, an epoxy resin composition comprising an epoxy resin and diethyl toluene diamine as a curing agent has been disclosed, however there are problems that this composition still has a high viscosity and poor injection workability around the room temperature and the obtained fiber-reinforced composite materials have some parts which have some unimpregnated parts with the resin, therefore the desired mechanical properties are not attained.

DISCLOSURE OF INVENTION

The epoxy resin compositions according to the present invention have the following construction in order to solve the above-mentioned problems. Accordingly an epoxy resin composition comprising an aromatic epoxy resin having at least di-functionality, an aromatic amine compound and/or an alicyclic amine compound, wherein 5 minutes after the main agent comprising the epoxy resin and the curing agent comprising the aromatic amine compound and/or the alicyclic amine compound are mixed at 25° C., the composition shows a viscosity at 25° C. in a range of from 1 to 1500 mPa sec, and Tc, tc, and Tg satisfy the following equation.

$$Tg \geq Tc + 20 - k \times (Tc - 90) \qquad (1)$$

k=0 when $60 \leq Tc < 90$ k=0.35 when $90 \leq Tc \leq 200$

Tc: highest temperature (°C.) during the curing process ($60 \leq Tc \leq 200$)

tc: retention time (min) at the highest temperature ($1 \leq tc \leq 120$)

Tg: glass transition point of the epoxy resin composition after a lapse of tc (min) at Tc (°C.).

BEST MODE FOR CARRYING OUT THE INVENTION

The present inventors have found that an epoxy resin composition in which an aromatic epoxy resin having at least di-functionality, and an aromatic amine compound and/or an alicyclic amine compound are blended (hereinafter simply referred to as an epoxy resin composition) can provide a greatly improved resin injection workability around a room temperature, i.e. around 25° C. in the present invention, and greatly improved impregnation of reinforcing fibers with the resin, and that the resulting fiber-reinforced composite materials have both high heat resistance and good mechanical properties, and completed the present invention.

The epoxy resin composition according to the present invention comprises an aromatic epoxy resin having at least di-functionality. Here, the term "functionality" as used in di-functionality means an epoxy group. Also in the present invention, the term "epoxy resin" is used to refer to the monomer or oligomer as well, which are not yet polymerized or cured. The term "epoxy resin composition" means a composition in which the elements which are required for the polymerization or curing reaction are mixed, and the term "cured epoxy resin" (or "cured resin", or "cured product" or "cured product of an epoxy resin composition") refers to a product obtained after the polymerization or curing reaction is carried out. The term "aromatic epoxy resin" means an epoxy resin having an aromatic ring in one molecule. The aromatic epoxy resin having at least di-functionality is blended in order to impart excellent heat resistance and mechanical properties to the fiber-reinforced composite materials (hereinafter simply abbreviated as composite materials) as it reacts with a curing agent to form a crosslinked structure.

It is necessary that the epoxy resin composition has a sufficiently low viscosity around the room temperature in order to improve the impregnation of the reinforcing fibers. But a too low viscosity becomes a cause of providing unimpregnated portions and voids in the obtained molded products. From the viewpoint of good injection workability, impregnating properties, and improved mixing of the main agent and the curing agent, the viscosity of the main agent and that of the curing agent at 25° C. shall be respectively within the range of from 1 to 3000 mPa sec, preferably from 1 to 2000 mPa sec, more preferably from 1 to 1000 mPa sec.

According to the present invention, when the viscosity of the main agent at 25° C. is within the range of from 2000 to 3000 mPa sec, the viscosity of the curing agent at 25° C. is preferably within the range of from 1 to 500 mPa sec. When the viscosity of the main agent at 25° C. is within the range of from 1000 to 2000 mPa sec, the viscosity of the curing agent at 25° C. is preferably within the range of from 1 to 1000 mPa sec. Furthermore, when the viscosity of the main agent at 25° C. is within the range of from 1 to 1000 mPa sec, the viscosity of the curing agent at 25° C. is preferably within the range of from 1 to 3000 mPa sec.

Various process can be employed depending on the applications in order to cure the epoxy resin composition which is obtained after the main agent and the curing agent are mixed. In one exemplary process, the temperature is raised at a fixed rate, and held constant temperature for the length of tc (min) after it reached the highest temperature Tc (°C.), then lowered. Or the so-called step-cure method can be another exemplary process, in which the temperature is raised at a fixed rate, and held constant temperature for a certain time, then it is raised again until it reach the highest temperature Tc (°C.), and held constant at that temperature for the length of tc (min), then it is lowered.

In order to attain a composite material having good heat resistance, the highest temperature Tc shall be within the range of from 60° C. to 200° C. during the curing process of the epoxy resin composition. In order to raise the productivity, the time tc for holding the highest temperature constant shall be within the range of from 1 to 120 minutes.

The glass transition point of the epoxy resin composition after a lapse of tc (min) at Tc (°C.) is measured according to the method described in EXAMPLES, after the resulting cured product of the epoxy resin composition is cooled from Tc (°C.) to the room temperature.

The heat resistance of the composite material is affected by the glass transition point Tg of the cured product of the epoxy resin composition, which is the matrix resin, and the glass transition point Tg generally changes depending on the Tc (°C.) which is the highest temperature during the curing process and the tc (min) the time during which the highest temperature is held constant.

According to the present invention, when the highest temperature Tc is in the low temperature region of not less than 60° C. and less than 90° C., the glass transition point Tg of the resin composition, which is the matrix resin, is required to be higher than the highest temperature Tc by 20° C. or more. That is, there must be Tc, tc, and Tg satisfying the following equation (1).

$$Tg \geq Tc+20 \quad (1)$$

When the highest temperature Tc is in a high temperature region of not less than 90° C. and not more than 200° C., there must be Tc, tc and Tg satisfying the following equation (1').

$$Tg \geq Tc+20-0.35 \times (Tc-90) \quad (1')$$

According to the present invention, the highest temperature Tc (°C.) and the retention time tc (min) satisfying the above-mentioned equation (1) or equation (1') are employed as the production conditions and composite materials are produced while the highest temperature Tc (°C.) is held constant for the length of time tc (min).

As the elastic modulus of the cured resin obtained by curing the epoxy resin composition affects the mechanical properties, in particular the compressive strength, of the composite material, according to the present invention, the tensile modulus of elasticity E of the cured resin plate determined by the following method shall be within the range of from 3.2 to 5 GPa, preferably from 3.4 to 4.8 GPa. When it is below 3.2 GPa, the compressive strength of the composite material may be insufficient, however, when it is over 5 GPa, the toughness of the composite material may be insufficient.

According to the present invention, it is preferable that the main agent and the curing agent which will be discussed later, are mixed prior to the use to provide an epoxy resin composition, then the composition is injected and molded product such as a composite material is produced.

The epoxy resin composition of the present invention, after the main agent and the curing agent are mixed and allowed to stand at 25° C. for 5 minutes, is required to have a viscosity at 25° C. (hereinafter represented by $\eta_5$) within the range of from 1 to 1500 mPa sec, preferably within the range of from 1 to 1000 mPa sec, more preferably within the range of from 10 to 700 mPa sec.

Furthermore, the epoxy resin composition of the present invention preferably has such a viscosity at 25° C. after the main agent and the curing agent are mixed and allowed to stand at 25° C. for 60 minutes (in mPa sec, represented as $\eta_{60}$) that satisfies the following equation (2);

$$1 \leq \eta_{60} \leq 1500 \quad (2)$$

more preferably the viscosity of the epoxy resin composition, which is allowed to stand at 25° C. for 120 minutes and measured at 25° C. (represented as $\eta_{120}$), is within the range of from 1 to 1500 mPa sec, particularly preferably the viscosity of the epoxy resin composition which is allowed to stand at 25° C. for 240 minutes (represented as $\eta_{240}$) is desirably within the range of from 1 to 1500 mPa sec.

Or, the viscosity of the epoxy resin composition, which is allowed to stand at 25° C. for 240 minutes, $\eta_{240}$, is desirably within the range of from 1 to 1000 mPa sec, more preferably it is within the range of from 10 to 700 mPa sec.

$\eta_{60}$ and $\eta_5$ of the epoxy resin composition according to the present invention are preferably such that $\eta_{60}$ divided by $\eta_5$ ($\eta_{60}/\eta_5$) satisfies the following equation (3);

$$1 \leq \eta_{60}/\eta_5 \leq 3 \quad (3)$$

more preferably $\eta_{120}/\eta_5$ is within the range of from 1 to 3, particularly preferably, $\eta_{240}/\eta_5$ is within the range of from 1 to 3. The epoxy resin compositions out of these limits, may have lowered resin injection workability and reinforcing fiber impregnation properties.

The aromatic epoxy resin having at least di-functionality for use in the present invention is an epoxy resin having an aromatic ring and two or more epoxy groups in one molecule. Examples of the aromatic epoxy resins having two epoxy groups include the following compounds.

Firstly bisphenol type epoxy resins including bisphenol A type epoxy resins obtained from bisphenol A, bisphenol F type epoxy resins obtained from bisphenol F, bisphenol S type epoxy resins obtained from bisphenol S, tetrabromobisphenol A type epoxy resins obtained from tetrabromobisphenol A, and the like. Commercially available bisphenol A type epoxy resins include EPIKOTE 825 (epoxy equivalent weight 172–178), EPIKOTE 828 (epoxy equivalent weight 184–194), EPIKOTE 834 (epoxy equivalent weight 230–270), EPIKOTE 1001 (epoxy equivalent weight 450–500), EPIKOTE 1002 (epoxy equivalent weight 600–700), EPIKOTE 1003 (epoxy equivalent weight 670–770), EPIKOTE 1004 (epoxy equivalent weight 875–975), EPIKOTE 1007 (epoxy equivalent weight 1750–2200), EPIKOTE 1009 (epoxy equivalent weight 2400–3300), EPIKOTE 1010 (epoxy equivalent weight 3000–5000) (all of these are registered trademark, manufactured by Yuka Shell Epoxy K.K.), EPOTOHTO YD-128 (epoxy equivalent weight 184–194), EPOTOHTO YD-011 (epoxy equivalent weight 450–500), EPOTOHTO YD-014 (epoxy equivalent weight 900–1000), EPOTOHTO YD-017 (epoxy equivalent weight 1750–2100), EPOTOHTO YD-019 (epoxy equivalent weight 2400–3000), EPOTOHTO YD-022 (epoxy equivalent weight 4000–6000) (all of these are registered trademark, manufactured by Tohto Kasei K.K.), EPICLON 840 (epoxy equivalent weight 180–190), EPICLON 850 (epoxy equivalent weight 184–194), EPICLONEPICLON 1050 (epoxy equivalent weight 450–500), EPICLON 3050 (epoxy equivalent weight 740–860), EPICLON HM-101 (epoxy equivalent weight 3200–3900)(all of these are registered trademark, manufactured by Dainippon Ink & Chemicals Inc.), SUMI-EPOXY ELA-128 (resistered trademark, epoxy equivalent weight 184–194, manufactured by Sumitomo Chemical Co., Ltd.), DER 331 (registered trademark, epoxy equivalent weight 182–192, manufactured by The Dow Chemical Co.) and the like. Commercially available bisphenol F type epoxy resins include EPIKOTE 806 (epoxy equivalent weight 160–170), EPIKOTE 807 (epoxy equivalent weight 160–175), EPIKOTE E4002P (epoxy equivalent weight 610), EPIKOTE E4003P (epoxy equivalent weight 800), EPIKOTE E4004P (epoxy equivalent weight 930), EPIKOTE E4007P (epoxy equivalent weight 2060), EPIKOTE E4009P (epoxy equivalent weight 3030), EPIKOTE E4010P (epoxy equivalent weight 4400) (all of these are registered trademark, manufactured by Yuka Shell Epoxy K.K.), EPICLON 830 (epoxy equivalent weight 170–190, manufactured by Dainippon Ink & Chemicals Inc.), EPOTOHTO YDF-2001 (epoxy equivalent weight 450–500), EPOTOHTO YDF-2004 (epoxy equivalent weight 900–1000) (all of these are registered trademark, manufactured by Toto Kasei K.K.) and the like. Commercially available bisphenol S type epoxy resins include DENACOL EX-251 (registered trademark, manufactured by Nagase Chemicals Ltd., epoxy equivalent weight 189). Commercially available tetrabromobisphenol A type epoxy resin include EPIKOTE 5050 (registered trademark, manufactured by Yuka Shell Epoxy K.K., epoxy equivalent weight 380–410), EPICLON 152 (manufactured by Dainippon Ink & Chemicals Inc., epoxy equivalent weight 340–380), SUMIEPOXY ESB-400T (manufactured by Sumitomo Chemical Co., Ltd., epoxy equivalent weight 380–420), EPOTOHTO YBD-360 (manufactured by Toto Kasei K.K., epoxy equivalent weight 350–370).

In addition to those, DENACOL EX-201, which is resorcin diglycidyl ether (registered trademark, manufactured by Nagase Chemicals Ltd., epoxy equivalent weight 118), DENACOL EX-203, which is hydroquinone diglycidyl ether (registered trademark, manufactured by Nagase Chemicals Ltd., epoxy equivalent weight 112), EPICLON HP-4032H, which is diglycidyl ether of 1,6-dihydroxynaphthalene (registered trademark, manufactured by Dainippon Ink & Chemicals Inc., epoxy equivalent weight 250), and EPON HPT RESIN 1079, which is diglycidyl ether of 9,9-bis(4-hydroxyphenyl)fluorene (registered trademark, manufactured by Shell Chemical Co., epoxy equivalent weight 250–260) can be employed as well.

Further examples include GAN, diglycidyl aniline (registered trademark, manufactured by Nippon Kayaku Co., Ltd., epoxy equivalent weight 115–135) and glycidyl esters such as diglycidyl phtharate, diglycidyl terephthalate and the like.

According to the present invention, one method of imparting better heat resistance and mechanical properties to the composite materials can be invisaged to increase the crosslinking density of the matrix resin. For such a purpose, it is preferable to blend an aromatic epoxy resin having at least tri-functionality. The amount of the aromatic epoxy resin having at least tri-functionality in the total amount of epoxy resins is preferably 50–100% by weight (more preferably 60–100% by weight, further preferably 70–100% by weight).

According to the present invention, an aromatic epoxy resin having tri-functionality represented by the chemical formula (I) is preferably blended.

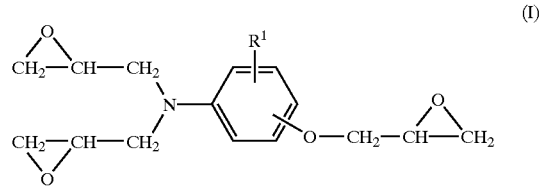

(I)

(wherein $R_1$ is hydrogen atom or an alkyl group having approximately 1–4 carbon atoms).

Commercially available examples of such epoxy resin include EPIKOTE 630 (registered trademark, manufactured by Yuka Shell Epoxy K.K., N,N-diglycidyl-p-glycidyl oxyaniline, viscosity in 25° C. environment: 600–700 mPa sec), ARALDITE MY0510 (registered trademark, manufactured by CIBA-GEIGY Co., N,N-diglycidyl-p-glycidyl oxyaniline, viscosity in 25° C. environment: 550–850 mPa sec), SUMIEPOXY ELM100 (registered trademark, manufactured by Sumitomo Chemical Co., Ltd., N,N-diglycidyl-4-glycidyloxy-2-methylaniline, viscosity in 50° C. environment: 1000–1700 mPa sec), SUMIEPOXY ELM120 (registered trademark, manufactured by Sumitomo Chemical Co., Ltd., N,N-diglycidyl-m-glycidyl oxyaniline, viscosity in 50° C. environment: 1500–3000 mPa sec) and the like. Among them, EPIKOTE 630 and ARALDITE MY0510 are particularly preferable due to their low viscosities.

The epoxy resin represented by chemical formula (I) can be blended alone or in admixture of two or more kinds.

According to the present invention, an aromatic epoxy resin having tetra-functionality such as those represented by chemical formula (II) can also be blended.

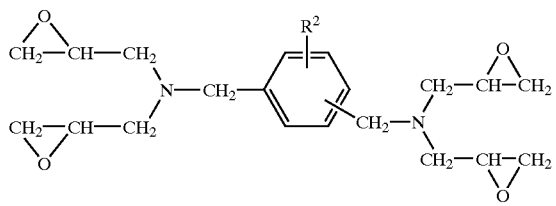
(II)

(wherein $R_2$ is hydrogen atom or an alkyl group having approximately 1–4 carbon atoms.)

Commercially available examples of such epoxy resin include TETRAD-X (registered trademark, manufactured by Mitsubishi Gas Chemical Co., Inc., N,N,N',N'-tetraglycidyl-m-xylylene diamine, viscosity in 25° C. environment: 1600–2500 mPa sec) and the like. The epoxy resin represented by chemical formula (II) can be blended alone or in admixture with an epoxy resin represented by chemical formula (I).

An aromatic epoxy resin having at least tri-functionality has a viscosity at 25° C. preferably within the range of from 1 to 3000 mPa sec, more preferably within the range of from 1 to 2000 mPa sec, particularly preferably within the range of from 1 to 1000 mPa sec. The viscosity of the aromatic epoxy resin being over 3000 mPa sec results in a high vicosity of the epoxy resin composition and the reinforcing fiber impregnation properties may be lowered.

The upper limit of the functionality of the aromtaic epoxy resin is not particularly limited, however, if the crosslinking density of the matrix resin in the composite material becomes too high, it may bring brittleness and result in insufficient toughness of the composite material disadvantageously. Taking those into consideration, the weight average number of functionality of the aromatic epoxy resin is preferably 2–6 (more preferably 2–5, further preferably 2–4).

Another method which can be envisaged to obtain excellent heat resistance and mechanical properties of the composite material according to the present invention is to link crosslinking points in the matrix resin with a rigid skeleton. However, when an epoxy resin comprising a rigid skeleton is blended, as the molcules have small degrees of internal freedom, the viscosity of the epoxy resin composition may be increased in some cases. In order to solve such a problem, an epoxy resin having a low molecular weight (preferably between 100 and 500) can be employed. Examples of an epoxy resin having a rigid skeleton and a low molecular weight include biphenyl type epoxy resins.

Commercially available examples of such an epoxy resin include EPIKOTE YX4000 (registered trademark, manufactured by Yuka Shell Epoxy K.K., 4,4'-dihydroxy-3,3',5,5'-tetramethylbiphenyl diglycidyl ether), EPIKOTE YX4000H (registered trademark, manufactured by Yuka Shell Epoxy K.K., 4,4'-dihydroxy-3,3',5,5'-tetramethylbiphenyl diglycidyl ether), EPIKOTE YL6121L (registered trademark, manufactured by Yuka Shell Epoxy K.K., 4,4'-dihydroxy-3,3',5,5'-tetramethylbipheny diglycidyl ether) and the like.

In order to optimize the viscosity of the epoxy resin composition according to the present invention, an epoxy resin having a low viscosity can be blended in addition to the aromatic epoxy resin having at least di-functionality.

Examples of such an epoxy resin having a low viscosity include glycidyl ether type aliphatic epoxy resins having at least di-functionality.

In order to raise the heat resistance and improve mechanical properties including compressive strength and the like, of the composite material according to the present invention, it is preferable that the glycidyl ether type aliphatic epoxy resin having at least di-functionality satisfies the following equation (4), more preferably equation (4').

$$0 \leq \alpha \leq 4 \qquad (4)$$

$$0 \leq \alpha \leq 3 \qquad (4')$$

Here, α shows a number of atoms which do not belong to a ring in the molecular chain which is produced by linking any two glycidyl oxy groups in a glycidyl ether type aliphatic epoxy resin having at least di-functionality, provided that the molecular chain has the largest number of atoms which do not belong to a ring.

α is an index showing flexibility of the molecular chain. The bigger the α is, the more flexible the molecular chain is, thereby the network structure of the matrix resin in the composite material becomes more flexible, and the heat resistance and the mechanical properties such as compressive strength of the composite material tend to become insufficient. The method in which α is obtained from the molecular structure of the epoxy resin will be explained in detail as follows.

The glycidyl ether type aliphatic epoxy resin having at least di-functionality, represented by the following chemical structure is taken as an example and the α thereof is obtained.

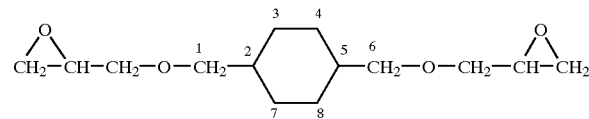

There can be two molecular chains linking two glycidyl groups as follows.
1-2-3-4-5-6
1-2-7-8-5-6

The number of the atoms which do not belong to a ring are two in both cases. Accordingly,α is 2.

Then a glycidyl ether type aliphatic epoxy resin having at least di-functionality represented by the following chemical structure is taken as an example and the a thereof is obtained.

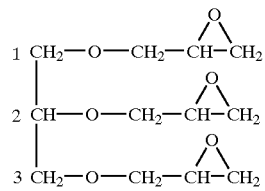

There can be three molecular chains linking three glycidyl groups as follows.
1-2
2-3
1-2-3

In the first and the second cases, the number of the atoms which do not belong to a ring is 2, and in the third case, the number of the atoms which do not belong to a ring is 3. Therefore, α is 3.

Commercially available examples of such a glycidyl ether type aliphatic epoxy resin having at least di-functionality, include the following products. DENACOL EX 810

(registered trademark, manufactured by Nagase Kasei Kogyo K.K., viscosity in 25° C. environment: 15 mPa sec, α=2, represented by the following chemical formula)

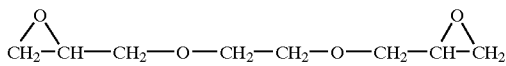

HELOXY 67 (registered trademark, manufactured by Yuka Shell Epoxy K.K., viscosity in 25° C. environment: 13–18 mPa sec, α=4, represented by the following chemical formula)

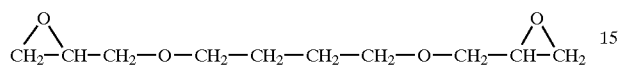

DENACOL EX911 (registered trademark, manufactured by Nagase Kasei Kogyo K.K., viscosity in 25° C.: 20 mPa sec, α=2, represented by the following chemical formula)

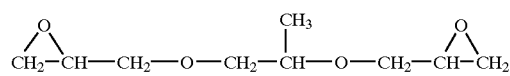

HELOXY 68 (registered trademark, manufactured by Yuka Shell Epoxy K.K., viscosity in 25° C. environment: 13–18 mPa sec, α=3, represented by the following chemical formula)

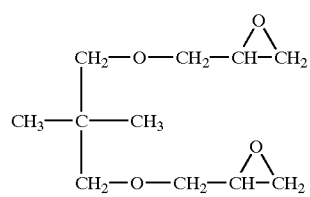

EPOLIGHT 80MF (registered trademark, manufactured by Kyoeisha Chemical Co., Ltd., viscosity in 25° C. environment: 120–190 mPa sec, α=3, represented by the following chemical formula)

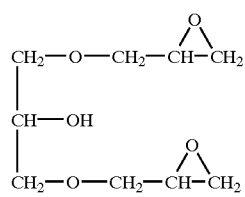

HELOXY 107 (registered trademark, manufactured by Yuka Shell Epoxy K.K., viscosity in 25° C. environment:55–75 mPa sec, α=2, represented by the following chemical formula)

DENACOL EX313 (registered trademark, manufactured by Nagase Kasei Kogyo K.K., viscosity in 25° C.: 150 mPa sec, α=3, represented by the following chemical formula)

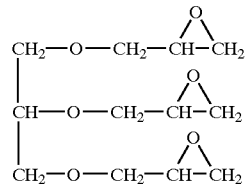

HELOXY 44 (registered trademark, manufactured by Yuka Shell Epoxy K.K., viscosity in 25° C. environment:200–330 mPa sec, α=3, represented by the following chemical formula)

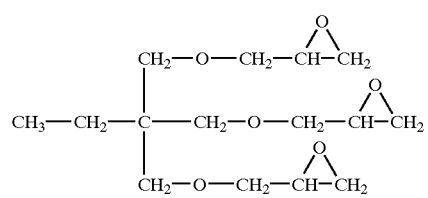

HELOXY 48 (registered trademark, manufactured by Yuka Shell Epoxy K.K., viscosity in 25° C. environment:125–250 mPa sec, α=3, represented by the following chemical formula)

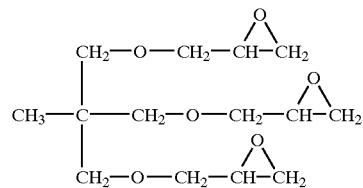

YL 6753 (Model, manufactured by Yuka Shell Epoxy K.K., viscosity in 25° C. environment:400 mPa sec, α=1, represented by the following chemical formula)

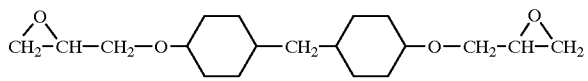

These glycidyl ether type aliphatic epoxy resins having at least di-functionality can be blended alone or blended in admixture of two or more kinds.

The amount of the blended glycidyl ether type aliphatic epoxy resins having at least di-functionality (the total amount when two or more kinds are employed) is preferably 1–50% by weight (more preferably 1–30% by weight, further preferably 1–10% by weight) based on the total amount of the epoxy resin as 100% by weight. When it exceeds 50% by weight, the heat resistance and mechanical properties, such as compressive strength, of the composite material may become insufficient.

Glycidyl ether type aliphatic epoxy resins having at least di-functionality have generally lower viscosities compared to the above-mentioned aromatic epoxy reins. A glycidyl ether type aliphatic epoxy resin having at least di-functionality preferably has a viscosity in 25° C. environment within a range of from 1 to 500 mPa sec, preferably 1–300 mPa sec, more preferably 1–100 mPa sec. When it exceeds 500 mPa sec, the viscosity of the epoxy resin composition becomes too high and the reinforcing fiber impregnation properties may be lowered.

The upper limit of the number of functionality of the glycidyl ether type aliphatic epoxy resins having at least di-functionality is not particularly limited, however, if the crosslinking density of the matrix resin in the composite material becomes too high, it may bring brittleness and result in insufficient toughness of the composite material disadvantageously. Taking those into consideration, the weight average number of functionality of the glycidyl ether type aliphatic epoxy resins is preferably 2–6 (more preferably 2–5, further preferably 2–4).

The epoxy resin composition according to the present invention comprises an aromatic amine compound and/or an alicyclic amine compound. These amine compounds are curing agents, mixed and reacted with the above-mentioned epoxy resins to provide a cured product.

The aromatic amine compound is a primary, secondary or tertiary amine having an aromatic ring, preferably a primary diamine having 6–25 (more preferaby 6–17) carbon atoms. The alicyclic amine compound is a primary, secondary or tertiary amine having an alicyclic ring, and preferably a primary diamine having 6–25 (more preferably 6–15) carbon atoms.

When the aromatic amine compound is blended, the aromatic amine compound preferably has a viscosity in 25° C. environment of within the range of from 1 to 3000 mPa sec, more preferably within the range of from 1 to 2000 mPa sec, particularly preferably within the range of from 1 to 1000 mPa sec. When it exceeds 3000 mPa sec, the viscosity of the epoxy resin composition becomes too high and the impregnation of the reinforcing fibers may be lowered.

Commercially available examples of the aromatic amine compound include EPICURE W (registered trademark, manufactured by Yuka Shell Epoxy K.K, a mixture of 2,4-diethyl-6-methyl-m-phenylene diamine and 4,6-diethyl-2-methyl-m-phenylene diamine, viscosity in 25° C. environment:100–400 mPa sec), KAYAHARD A-A (registered trademark, manufactured by Nippon Kayaku Co., Ltd., 2,2'-diethyl-4,4'-methylene dianiline, viscosity in 25° C. environment: 2000–3000 mPa sec), KAYAHARD A-B (registered trademark, manufactured by Nippon Kayaku Co., Ltd., a mixture of 2,2'-diethyl-4,4'-methylene dianiline and 4,4'-methylene dianiline, viscosity in 25° C. environment: 1500–2500 mPa sec).

When an alicyclic amine compound is blended, the alicyclic amine compound preferably has a viscosity in 25° C. environment within the range of from 1 to 500 mPa sec, preferably within the range of from 1 to 300 mPa sec. When it exceeds 500 mPa sec, the viscosity of the epoxy resin composition becomes too high and the impregnatoin of the reinforcing fibers may be lowered. In order to raise the heat resistance and mechanical properties including compressive strength and the like of the composite material, it is preferable that the alicyclic amine compound satisfies the following equation (5), more preferably equation (5').

$$0 \leq \beta \leq 4 \quad (5)$$

$$0 \leq \beta \leq 3 \quad (5')$$

Here, $\beta$ shows a number of atoms which do not belong to a ring in the molecular chain which is produced by linking any two amino groups in an alicyclic amine compound, provided that the molecular chain has the largest number of atoms which do not belong to a ring.

$\beta$ is an index showing flexibility of the molecular chain. The bigger the $\beta$ is, the more flexible the molecular chain is, thereby the network structure of the matrix resin in the composite material becomes more flexible, and the heat resistance and the mechanical properties of the composite material tend to become insufficient.

If two or more kinds of alicyclic amine compounds having different $\beta$ values exist, the overall $\beta$ value shall be calculated by molal average.

An alicyclic amine compound preferably has an amino group in the molecule bonded to the secondary or tertiary carbon to prevent the viscosity of the epoxy resin composition from rising too much. This is because the amine bonded to the primary carbon generally reacts with an epoxy group at a higher reaction rate than the amine bonded to the secondary carbon or the tertiary carbon. In order to fully express such effects, the number of amino groups bonded to the secondary or tertiary carbon atoms is desirably in an amount of 50% or more, more preferably 70% or more, further preferably 90% or more of all the amino groups in the entire alicyclic amine compounds.

In addition to that, all the amino groups in the alicyclic amine compound are preferably bonded to such carbon atoms that constitute the ring structure, in order to improve the heat resistance and mechanical properties such as compressive strength of the composite material.

Commercially available alicyclic amine compounds include AMICURE PACM (registered trademark, manufactured by Air Products, 4,4'-methylene bis cyclohexyl amine, viscosity in 25° C. environment: 80 mPa sec, $\beta=1$), ANCAMINE2049 (registered trademark, manufactured by Air Products, 2,2'-dimethyl-4,4'-methylene bis cyclohexyl amine, viscosity in 25° C. environment: 120 mPa sec, $\beta=1$), DCH-99 (Type, manufactured by E. I. du Pont de Nemours and Company, 1,2-cyclohexane diamine, viscosity in 21° C. environment: 7 mPa sec, $\beta=0$), 1,8-menthene diamine (manufactured by Sigma-Aldrich Co., viscosity in 25° C. environment; 80 mPa sec, $\beta=1$), isophorone diamine (manufactured by Hyurs Co., viscosity in 25° C. environment: 13 mPa sec, $\beta=1$), 1,3-bis aminomethyl cyclohexane (produced by Mitsubishi Gas Chemical Co., Inc, viscosity in 25° C. environment: 9 mPa sec, $\beta=2$), 2,5(6)-bis amino methyl norbornane (produced by Mitsui Chemicals Inc., viscosity in 25° C. environment: 16 mPa sec, $\beta=2$) and the like.

According to the present invention, an amine compound except for an aromatic amine compound and an alicyclic amine compound can be blended as a curing agent as well.

According to the present invention, the number of the active hydrogen (active hydrogen is a hydrogen atom which is bonded to nitrogen atom, oxgen atom and sulfur atom etc in an organic compound and has high reactivity, and plays a big role in crosslinking reaction) of the amine compound contained in the epoxy resin composition is preferably within the range of from 4 to 24, more preferably from 4 to 16, further preferably from 4 to 8. When it is below the lower limit of the above-mentioned numerical range, the crosslinking density of the matrix resin is reduced and heat resistance and elastic modulus are lowered, therefore the heat resistance and mechanical properties including compressive strength of the composite material tend to be lowered. When it exceeds the upper limit, the crosslinking density of the matrix resin in the composite material is increased too much and that brings brittleness, and the toughness of the composite material tends to become insufficient. When two or more kinds of amine compounds are mixed, the number of the active hydrogen shall be calculated by weight average. The amine compound having 4 or more active hydrogen atoms is preferably present in an amount of 50–100%, based on the total amine compounds.

Though it depends on the cases, the ratio of the aromatic amine compound and/or the alicyclic amine compound based on the total amine compounds is preferably 50–100% by weight.

The main agent and the curing agent are preferably mixed at a mixing ratio which is decided according to the following equation (6);

$$0.5 \leq R/Re \leq 2 \quad (6)$$

wherein, R is the ratio of the curing agent to the main agent by weight, Re is the ratio of the epoxy groups (in mole) per 1 g of the main agent to the active hydrogen atoms (in mole) per 1 g of the curing agent.

According to the present invention, appropriate curing promoters can be blended as well for the purpose of reducing the highest temperature Tc (°C.) and retention time tc (min). As the curing promoter, any known promoter can be used. More specifically, sulfonic esters disclosed in the specific-aion of U.S. Pat. No. 5,688,877, and sulfonium salts disclosed in the specification of U.S. Pat. No. 4,554,342 can be preferably employed. According to the present invention, coloring agents, surfactants, and fire retardant additives can be blended as well according to each purpose. Provided that the ratio of the epoxy resin (including the curing agent) to the resin matrix (excluding the reinforcing fibers, or fillers in the form of a granule and a short fiber and the like) is preferably not less than 80% by weight.

The epoxy resin composition according to the present invention is preferably employed for producing a composite material by the use of RTM method. In an overview regarding the general technology of the recent RTM method (SAMPE Journal, Vol.34, No.6, pp.7–19), the following molding methods similar to the RTM methods are introduced, i.e. VARTM (Vacuum-Assisted RTM), VIMP (Variable Infusion Molding Process), TERTM (Thermal-Expansion RTM), RARTM (Rubber-Assisted RTM), RIRM (Resin Injection Recirculation Molding), CRTM (Continuous RTM), CIRTM (Co-Injection Resin Transfer Molding), RLI (Resin Liquid Infusion), and SCRIMP (Seeman's Composite Resin Infusion Molding Process) etc. The epoxy resin compositions according to the present invention can also be preferably employed in such a molding method that is similar to the RTM method.

Preforms for use in the RTM method are produced by processing reinforcing fibres such as carbon fiber, glass fiber, and aramid fiber and the like in the form of a mat, woven fabric, knitted fabric, braid, and undirectional sheet and the like. Tn particular, carbon fibers are preferably employed in order to obtain a lightweight and strong component. The fiber content of the reinforcing fiber is preferably 30–85% by weight.

The epoxy resin composition according to the present invention can be suitably employed for a method in which reinforcing fibers are impregnated with a liquid epoxy resin around at a room temperature, such as hand lay-up method, filament winding method, and pull-trusion method and the like.

EXAMPLES

The present invention will be described in detail by way of example. Various samples used for Examples and Comparative Examples were prepared and the physical properties thereof were determined under the following conditions. The results of these Examples and the Comparative Example are summarized in the Tables 1–5.

A. Viscosity

Viscosity of the main agent and that of the curing agent were determined in 25° C. environment, according to the viscosity measurement method of JIS Z8803 in which a cone and plate rotational viscometer is employed.

100 g of an epoxy resin composition obtained by mixing the main agent and the curing agent (after the homogeneous dispersion was confirmed by visual observation, the dispersion was further stirred by spatula, for the total of about 3 minutes), was put into a polyethylene cup having a circular bottom of 25-mm radius, and a cylindrical portion having an inner diameter of 50 mm and a height of 75 mm, and the viscosity $\eta_5$ at the time point after a lapse of 5 minutes at 25° C., the viscosity $\eta_{60}$ at the time point after a lapse of 60 minutes at 25° C., the viscosity $\eta_{120}$ at the time point after a lapse of 120 minutes at 25° C., and the viscosity $\eta_{240}$ at the time point after a lapse of 240 minutes at 25° C. were measured according to the above-mentioned method.

When the viscosity was from 1 to 100 mPa sec, E type viscometer (ELD type) manufactured by Tokisangyo was employed, and when the viscosity was from 100 to 50,000 mPa sec, E type viscometer (EHD type) manufactured by Tokisangyo was employed. The rotor of the E type viscometer had an angle of 1°34' and a diameter of 24 mm.

B. Preparation of a Cured Resin Plate

An epoxy resin composition obtaint by mixing an epoxy resin and a curing agent was injected into a mold having a planar cavity with a thickness of 2 mm, and cured in an oven under the following curing conditions to give a cured resin plate having a thickness of 2 mm.

C. Glass Transition Point Tg

Then a cured resin plate obtained according to the above-mentioned method B was tested by DMA method in accordance with SACMA SRM18R-94 for the glass transition point Tg. Here, Dynamic Analyzer RDA-II type manufactured by Rheometrics was used and the measurement was carried out at the temperature rising speed of 5° C./min, measuring frequency of 1 Hz.

D. Tensile Modulus of Elasticity

From the cured resin plate obtained according to the above-mentioned method B, was prepared a small No.1 (1/2) test specimen and it was subjected to measurement according to JIS K7113 by using TENSILON in 23° C. environment to give a stress-strain curve. The tensile modulus of elasticity E was obtained according to the following equation from the tensile stress $\sigma_{0.001}$ (GPa) at the strain of 0.001, and the tensile stress $\sigma_{0.003}$ (GPa) at the strain of 0.003.

$$E(GPa) = (\sigma_{0.003} - \sigma_{0.001})/(0.003 - 0.001)$$

E. Preparation of a Composite Material

A composite material was prepared by RTM method. A mold having a top force and a bottom force, having a cavity with a length of 200 mm, a width of 200 mm, and a height of 2.0 mm was employed. As a preform, 10 sheets of a carbon fiber woven fabric (Model:CO7373, 193 g/m² manufactured by Toray Co.,) having a length of 190 mm and a width of 190 mm were laminated such that the fibers were aligned in the same direction.

Firstly, the preform was set in the cavity of the mold and a vacuum pump was connected to a suction inlet (at one point) provided on the side surface of the mold, and the pressure inside of the mold was reduced to not more than 0.1 mmHg, then a resin composition obtained by mixing the main agent and the curing agent, followed by being allowed to stand under a reduced pressure for 30 minutes to carry out de-gassing, was poured through the resin inlet provided at the center of the top force and the preform was impregnated therewith. At the time point when the resin was flowed out from the suction inlet, the resin inlet then the suction inlet were closed and the mold was heated in an oven to cure the resin composition to give a planar composite material.

F. 0° Compressive Strength

The planar composite material obtained in the above-mentioned method E was subjected to measurement for 0° compressive strength according to method A of JIS K7076.

Example 1

EPIKOTE 630 was employed as an epoxy resin, and EPICURE W was employed as a curing agent and the viscosity of each material and the viscosity $\eta_5$, $\eta_{60}$, $\eta_{120}$ and $\eta_{240}$ after they were mixed were measured. Here, the mixing ratio (the ratio of the weight of the main agent to the weight of the curing agent, hereinafter referred to as mixing ratio R) was set to 0.464.

Then a cured resin plate was prepared according to the following procedure;
(1) raising the temperature of the composition at 1.5° C./min to 180° C.,
(2) maintaining the temperature at 180° C. for 120 minutes, and
(3) lowering the temperature at 2.5° C./min to 25° C.

The obtained cured resin plate was subjected to the measurement for the glass transition point Tg and the tensile modulus of elasticity E.

Example 2

EPIKOTE 630 was employed as an epoxy resin, and ANCAMINE 2049 was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.613.

Then a cured resin plate was prepared according to the following procedure;
(1) raising the temperature of the composition at 1.5° C./min to 60° C.,
(2) maintaining the temperature at 60° C. for 180 minutes,
(3) raising the temperature at 1.5° C./min to 180° C.,
(4) maintaining the temperature at 180° C. for 120 minutes, and
(5) lowering the temperature at 2.5° C./min to 25° C.

The obtained cured resin plate was subjected to the measurement for the glass transition point Tg and the tensile modulus of elasticity E.

Example 3

A mixture of 60 parts by weight of EPIKOTE 630 and 40 parts by weight of EPIKOTE 807 was employed as epoxy resins, and EPICURE W was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.384.

Then a cured resin plate was prepared according to the procedure similar to that used in Example 1. The obtained cured resin plate was subjected to the measurement for the glass transition point Tg and the tensile modulus of elasticity E.

Example 4

A mixture of 70 parts by weight of EPIKOTE 630 and 30 parts by weight of HELOXY 107 was employed as epoxy resins, and EPICURE W was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.409.

Then a cured resin plate was prepared according to the procedure similar to that used in Example 1. The obtained cured resin plate was subjected to the measurement for the glass transition point Tg and the tensile modulus of elasticity E.

Example 5

A mixture of 90 parts by weight of EPIKOTE 630 and 10 parts by weight of HELOXY 68 was employed as epoxy resins, and EPICURE W was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.448.

Then a cured resin plate was prepared according to the procedure similar to that used in Example 1. The obtained cured resin plate was subjected to the measurement for the glass transition point Tg and the tensile modulus of elasticity E.

Example 6

A mixture of 90 parts by weight of EPIKOTE 630 and 10 parts by weight of HELOXY 68 was employed as epoxy resins, and ANCAMINE 2049 was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.592.

Then a cured resin plate was prepared according to the procedure similar to that used in Example 2. The obtained cured resin plate was subjected to the measurement for the glass transition point Tg and the tensile modulus of elasticity E.

Example 7

A mixture of 90 parts by weight of EPIKOTE 630 and 10 parts by weight of HELOXY 68 was employed as epoxy resins, and ANCAMINE 2049 was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.592.

Then a cured resin plate was prepared according to the following procedure;
(1) raising the temperature of the composition at 1.5° C./min to 60° C.,
(2) maintaining the temperature at 60° C. for 180 minutes,
(3) raising the temperature at 1.5° C./min to 130° C.,
(4) maintaining the temperature at 130° C. for 120 minutes, and
(5) lowering the temperature at 2.5° C./min to 25° C.

The obtained cured resin plate was subjected to the measurement for the glass transition point Tg and the tensile modulus of elasticity E.

Example 8

A mixture of 70 parts by weight of EPIKOTE 630 and 30 parts by weight of EPOMIC R710 was employed as epoxy resins, and EPICURE W was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.402.

Then a cured resin plate was prepared according to procedure similar to that used in Example 1. The obtained cured resin plate was subjected to the measurement for the glass transition point Tg and the tensile modulus of elasticity E.

Example 9

A mixture of 70 parts by weight of EPIKOTE 630 and 30 parts by weight of GAN was employed as epoxy resins, and EPICURE W was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.433.

Then a cured resin plate was prepared according to the procedure similar to that used in Example 1. The obtained cured resin plate was subjected to the measurement for the glass transition point Tg and the tensile modulus of elasticity E.

Example 10

A mixture of 70 parts by weight of EPIKOTE 630 and 30 parts by weight of GAN was employed as epoxy resins, and ANCAMINE 2049 was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.572.

Then a cured resin plate was prepared according to the procedure similar to that used in Example 2. The obtained cured resin plate was subjected to the measurement for the glass transition point Tg and the tensile modulus of elasticity E.

Example 11

A mixture of 70 parts by weight of EPIKOTE 630 and 30 parts by weight of DENACOL EX721 was employed as epoxy resins, and EPICURE W was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.412.

Then a cured resin plate was prepared according to the procedure similar to that used in Example 1. The obtained cured resin plate was subjected to the measurement for the glass transition point Tg and the tensile modulus of elasticity E.

Example 12

A mixture of 90 parts by weight of EPIKOTE 828 and 10 parts by weight of HELOXY 68 was employed as epoxy resins, and isophorone diamine was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.232.

Then a cured resin plate was prepared according to the procedure similar to that used in Example 7. The obtained cured resin plate was subjected to the measurement for the glass transition point Tg and the tensile modulus of elasticity E.

Example 13

A mixture of 30 parts by weight of EPIKOTE 630 and 70 parts by weight of EPIKOTE 807 was employed as epoxy resins, and a mixture of 50 parts by weight of isophorone diamine and 50 parts by weight of ANCAMINE 2049 was employed as curing agents and the viscosity of each material and the viscosity of the resulting composition $\eta_5$, $\eta_{60}$, $\eta_{120}$ and $\eta_{240}$ after they were mixed were measured. Here, the mixing ratio R was set to 0.358.

Then a cured resin plate was prepared according to the procedure similar to that used in Example 7. The obtained cured resin plate was subjected to the measurement for the glass transition point Tg and the tensile modulus of elasticity E.

Example 14

The same epoxy resin composition as that used in Example 5 was employed and a composite material was prepared according to the following procedure;
(1) raising the temperature of the composition at 1.5° C./min to 60° C.,
(2) maintaining the temperature at 90° C. for 600 minutes,
(3) raising the temperature at 1.5° C./min to 180° C.,
(4) maintaining the temperature at 180° C. for 120 minutes, and
(5) lowering the temperature at 2.5° C./min to 25° C.

The obtained composite material was observed with an optical microscope for the external surface and the cross section. No unimpregnated part or voids were observed and the quality of the product was good. The composite material was then subjected to the measurement for 0° compressive strength.

Example 15

The same epoxy resin composition as that used in Example 6 was employed and a composite material was prepared according to the following procedure;
(1) raising the temperature of the composition at 1.5° C./min to 60° C.,
(2) maintaining the temperature at 60° C. for 180 minutes,
(3) raising the temperature at 1.5° C./min to 180° C.,
(4) maintaining the temperature at 180° C. for 120 minutes, and
(5) lowering the temperature at 2.5° C./min to 25° C.

The obtained composite material was observed with an optical microscope for the external surface and the cross section. No unimpregnated part or voids were observed and the quality of the product was good. The composite material was then subjected to the measurement for 0° compressive strength.

Comparative Example 1

EPIKOTE 630 was employed as an epoxy resin, and JEFFAMINE D230 (registered trademark, manufactured by Jefferson Chemical Company, polyoxypropylene diamine, viscosity in 25° C. environment: 9 mPa sec, β=9.8) was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.621.

Then a cured resin plate was prepared according to the procedure similar to that used in Example 2. The obtained cured resin plate was subjected to the measurement for the glass transition point Tg and the tensile modulus of elasticity E.

Comparative Example 2

EPIKOTE 828 was employed as an epoxy resin, and EPICURE w was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.283.

Then a cured resin plate was prepared according to the procedure similar to that used in Example 1. The obtained cured resin plate was subjected to the measurement for the glass transition point Tg and the tensile modulus of elasticity E.

Comparative Example 3

EPIKOTE 828 was employed as an epoxy resin, and ANCAMINE 2049 was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.374.

Then a cured resin plate was prepared according to the procedure similar to that used in Example 2. The obtained cured resin plate was subjected to the measurement for the glass transition point Tg and the tensile modulus of elasticity E.

Comparative Example 4

EPIKOTE 828 was employed as an epoxy resin, and JEFFAMINE D230 was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.379.

Then a cured resin plate was prepared according to the procedure similar to that used in Example 2. The obtained cured resin plate was subjected to the measurement for the glass transition point Tg and the tensile modulus of elasticity E.

Comparative Example 5

A mixture of 40 parts by weight of EPIKOTE 630 and 60 parts by weight of HELOXY 107 was employed as an epoxy resin, and EPICURE W was employed as a curing agent and the viscosity of each material and the viscosity of the resulting composition $\eta_5$ and $\eta_{240}$ after they were mixed were measured. Here, the mixing ratio R was set to 0.354.

Then a cured resin plate was prepared according to the procedure similar to that used in Example 1. The obtained cured resin plate was subjected to the measurement for the glass transition point Tg and the tensile modulus of elasticity E.

Comparative Example 6

A mixture of 70 parts by weight of EPIKOTE 630 and 30 parts by weight of YED 216 (registered trademark, manufactured by Yuka Shell Epoxy K.K., 1,6-hexane diol diglycidyl ether, viscosity in 25° C. environment: 15–35 mPa sec, $\alpha=6$) was employed as epoxy resins, and EPICURE W was employed as a curing agent and the viscosity of each material and the viscosity of the resulting composition $\eta_5$, $\eta_{60}$, $\eta_{120}$ and $\eta_{240}$ after they were mixed were measured. Here, the mixing ratio R was set to 0.412.

Then a cured resin plate was prepared according to the procedure similar to that used in Example 1. The obtained cured resin plate was subjected to the measurement for the glass transition point Tg and the tensile modulus of elasticity E.

Comparative Example 7

The same epoxy resin composition as that used in Comparative Example 1 was employed and a composite material was prepared in a similar procedure as that used in Example 15.

The obtained composite material was observed with an optical microscope for the external surface and the cross section. No unimpregnated part or voids were observed and the quality of the product was good. The composite material was subjected to the measurement for 0° compressive strength.

Comparative Example 8

The same epoxy resin composition as that used in Comparative Example 2 was employed and a composite material was prepared in a similar procedure as that used in Example 14.

At the end of the obtained composite material, there was a part which was not impregnated with the resin, and the quality of the product was poor.

TABLE 1

|  | Example 1 | Example 2 | Example 3 | Example 4 | Example 5 |
|---|---|---|---|---|---|
| Epoxy resin compositions (Main Agent) | | | | | |
| EPIKOTE 630 [3ArEp] | 100 | 100 | 60 | 70 | 90 |
| EPIKOTE 807 [2ArEp] | | | 40 | | |
| HELOXY 107 [2GlFaEp] | | | | 30 | |
| HELOXY 68 [2GlFaEp] | | | | | 10 |
| (Curing Agent) | | | | | |
| EPICURE W [ArAm] | 46.4 | | 38.4 | 40.9 | 44.8 |
| ANCAMINE 2049 [FaAm] | | 61.3 | | | |
| Viscosity of Main Agent (mPa · s) | 680 | 680 | 1180 | 278 | 362 |
| Viscosity of Curing Agent (mPa · s) | 187 | 120 | 187 | 187 | 187 |
| Mixing Ratio R | 0.464 | 0.613 | 0.384 | 0.409 | 0.448 |
| $\eta_5$ (mPa · s) | 670 | 270 | 980 | 344 | 474 |
| $\eta_{60}$ (mPa · s) | 675 | 292 | 988 | 346 | 477 |
| $\eta_{120}$ (mPa · s) | 678 | 332 | 995 | 351 | 480 |
| $\eta_{240}$ (mPa · s) | 690 | 420 | 1020 | 360 | 488 |
| Curing Conditions | | | | | |
| Tc (° C.) highest temperature during the curing process | 180 | 180 | 180 | 180 | 180 |
| tc (min) retention time | 120 | 120 | 120 | 120 | 120 |

TABLE 1-continued

|  | Example 1 | Example 2 | Example 3 | Example 4 | Example 5 |
|---|---|---|---|---|---|
| at the highest temperature |  |  |  |  |  |
| Tc + 20 − k × (Tc − 90) (° C.) | 169 | 169 | 169 | 169 | 169 |
| Physical properties of the cured resin |  |  |  |  |  |
| Glass Transitidn Point Tg (° C.) | 227 | 230 | 203 | 192 | 210 |
| Tensile Modulus of Elasticity E (GPa) | 3.6 | 3.6 | 3.3 | 3.5 | 3.5 |

TABLE 2

|  | Example 6 | Example 7 | Example 8 | Example 9 | Example 10 |
|---|---|---|---|---|---|
| Epoxy resin compositions (Main Agent) |  |  |  |  |  |
| EPIKOTE 630 [3ArEp] | 90 | 90 | 70 | 70 | 70 |
| HELOXY 68 [2GlFaEp] | 10 | 10 |  |  |  |
| EPOMIC R710 [2ArEp] |  |  | 30 |  |  |
| GAN [2ArEp] |  |  |  | 30 | 30 |
| (Curing Agent) |  |  |  |  |  |
| EPICURE W [ArAm] |  |  | 40.2 | 43.3 |  |
| ANCAMINE 2049 [CyAm] | 59.2 | 59.2 |  |  | 57.2 |
| Viscosity of Main Agent (mPa · s) | 362 | 362 | 1027 | 439 | 439 |
| Viscosity of Curing Agent (mPa · s) | 120 | 120 | 187 | 187 | 120 |
| Mixing Ratio R | 0.592 | 0.592 | 0.402 | 0.433 | 0.572 |
| $\eta_5$ (mPa · s) | 211 | 211 | 823 | 501 | 238 |
| $\eta_{60}$ (mPa · s) | 243 | 243 | 829 | 509 | 299 |
| $\eta_{120}$ (mPa · s) | 297 | 297 | 835 | 519 | 416 |
| $\eta_{240}$ (mPa · s) | 443 | 443 | 850 | 544 | 713 |
| Curing Conditions |  |  |  |  |  |
| Tc (° C.) highest temperature during the curing process | 180 | 130 | 180 | 180 | 180 |
| tc (min) retention time at the highest temperature | 120 | 120 | 120 | 120 | 120 |
| Tc + 20 − k × (Tc − 90) (° C.) | 169 | 136 | 169 | 169 | 169 |
| Physical Properties of the Cured Resin |  |  |  |  |  |
| Glass Transition Point Tg (° C.) | 222 | 171 | 211 | 205 | 211 |
| Tensile Modulus of Elasticity E (GPa) | 3.7 | 3.2 | 3.4 | 3.9 | 4.0 |

TABLE 3

|  | Example 11 | Example 12 | Example 13 |
|---|---|---|---|
| Epoxy resin compositions (Main Agent) |  |  |  |
| EPIKOTE 630 [3ArEp] | 70 |  | 30 |
| DENACOL EX721 [2ArEp] | 30 |  |  |
| EPIKOTE 828 [2ArEp] |  | 90 |  |
| EPIKOTE 807 [2ArEp] |  |  | 70 |
| HELOXY 68 [2GlFaEp] |  | 10 |  |
| (Curing Agent) |  |  |  |
| EPICURE W [ArAm] | 41.2 |  |  |
| ANCAMINE 2049 [CyArAm] |  |  | 17.9 |
| Isophorone Diamine [CyArAm] |  | 23.2 | 17.9 |
| Viscosity of Main Agent (mPa · s) | 685 | 3600 | 1990 |
| Viscosity of Curing Agent (mPa · s) | 187 | 18 | 33 |
| Mixing Ratio R | 0.412 | 0.232 | 0.358 |
| $\eta_5$ (mPa · s) | 698 | 1020 | 465 |
| $\eta_{60}$ (mPa · s) | 709 | 2610 | 749 |
| $\eta_{120}$ (mPa · s) | 720 | 17400 | 1540 |
| $\eta_{240}$ (mPa · s) | 750 | n/a | 33600 |
| Curing Conditions |  |  |  |
| Tc (° C.) highest temperature during the | 180 | 130 | 130 |

TABLE 3-continued

|  | Example 11 | Example 12 | Example 13 |
|---|---|---|---|
| curing process |  |  |  |
| tc (min) retention time at the highest temperature | 120 | 120 | 120 |
| Tc + 20 − k × (Tc − 90) (° C.) | 169 | 136 | 136 |
| Physical Properties of theCured Resin |  |  |  |
| Glass Transition Point Tg (° C.) | 195 | 141 | 137 |
| Tensile Modulus of Elasticity E (GPa) | 3.9 | 3.3 | 3.4 |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Epoxy resin compositions (Main Agent) |  |  |  |  |  |  |
| EPIKOTE 630 [3ArEp] | 100 |  |  |  | 40 | 70 |
| EPIKOTE 828 [2ArEp] |  | 100 | 100 | 100 |  |  |
| HELOXY 107 [2GlFaEp] |  |  |  |  | 60 |  |
| YED 216 [2G1FaEp] |  |  |  |  |  | 30 |
| (Curing Agent) |  |  |  |  |  |  |
| EPICURE W [ArAm] |  | 28.3 |  |  | 35.4 | 41.2 |
| ANCAMINE 2049 [CyAm] |  |  | 37.4 |  |  |  |
| JEFFAMINE D230 [FaAm] | 62.1 |  |  | 37.9 |  |  |
| Viscosity of Main Agent (mPa · s) | 680 | 14600 | 14600 | 14600 | 138 | 52 |
| Viscosity of Curing Agent (mPa · s) | 9 | 187 | 120 | 9 | 187 | 187 |
| Mixing Ratio R | 0.621 | 0.283 | 0.374 | 0.379 | 0.354 | 0.412 |
| $\eta_5$ (mPa sec) | 73 | 5100 | 3410 | 513 | 202 | 209 |
| $\eta_{60}$ (mPa sec) | 84 | 5120 | 5240 | 1010 | 203 | 210 |
| $\eta_{120}$ (mPa sec) | 99 | 5160 | 9620 | 1840 | 203 | 212 |
| $\eta_{240}$ (mPa sec) | 139 | 5200 | 24200 | 4090 | 205 | 214 |
| Curing Conditions |  |  |  |  |  |  |
| TC (° C.) highest temperature during the curing process | 180 | 180 | 180 | 180 | 180 | 180 |
| tc (min) retention time at the highest temperature | 120 | 120 | 120 | 120 | 120 | 120 |
| Tc + 20 − k × (Tc − 90) (° C.) | 169 | 169 | 169 | 169 | 169 | 169 |
| Physical Properties of the Cured Resin |  |  |  |  |  |  |
| Glass Transition Point Tg (° C.) | 151 | 197 | 203 | 129 | 128 | 167 |
| Tensile Modulus of Elasticity E (GPa) | 3.0 | 3.1 | 3.0 | 2.8 | 3.1 | 3.1 |

TABLE 5

|  | Example 14 | Example 15 | Comparative Example 7 | Comparative Example 8 |
|---|---|---|---|---|
| Epoxy Resin Compositions (Epoxy resin) |  |  |  |  |
| EPIKOTE 630 [3ArEp] | 90 | 90 | 100 |  |
| HELOXY 68 [2GlFaEp] | 10 | 10 |  |  |
| EPIKOTE 828 [2GlFaEp] |  |  |  | 100 |
| (Curing Agent) |  |  |  |  |
| EPICURE W [ArAm] | 44.8 |  |  | 28.3 |
| ANCAMINE 2049 [CyAm] |  | 59.2 |  |  |
| JEFFAMINE D230 [FaArAm] |  |  | 62.1 |  |
| Quality of the Product | Good | Good | Good | Inferior Impregnation |
| 0° C. Compressive Strength (MPa) | 615 | 658 | 533 | — |

(Explanation of abbreviations used in Tables 1–5)
[3ArEp]: tri-functional aromatic epoxy resin
[2ArEp]: di-functional aromatic epoxy resin
[2GeFaEp]: di-functional glycidyl ether type aliphatic epoxy resin
[ArAm]: aromatic amine compound
[CyAm]: alicyclic amine compound
[FaAm]: aliphatic amine compound Industrial Applicability According to the present invention, there is provided an epoxy resin composition having a low viscosity around the room temperature and excellent reinforcing fiber impregnating characteristics. By the use of such an epoxy resin composition, a composite material having excellent heat resistance and mechanical properties including a compressive strength can be produced.

The composite material obtained from the epoxy resin composition according to the present invention can be suitably applied for a structural component for an aircraft, artificial satellite, automobile, bicycle, railcar, ship, or building material, flywheel, pressure vessel, windmill blade, oil riser and sporting-goods and the like. It can be particularly preferably employed for a structural component for an aircraft and artificial satellite which require high heat resistance.

What is claimed is:

1. An epoxy resin composition comprising a main agent and a curing agent, the main agent comprising an aromatic epoxy resin having at least a di-functionality and the curing agent comprising an aromatic amine compound and/or an alicyclic amine compound, wherein 5 minutes after the main agent and the curing agent are mixed at 25° C., the epoxy resin composition shows a viscosity at 25° C. in a range of from about 1 to 1500 mPa sec, and Tc, tc, and Tg satisfy the following equation:

$$Tg \geq Tc + 20 - k \times (Tc - 90) \quad (1)$$

wherein k=0 when $60 \leq Tc < 90$ and k=0.35 when $90 \leq Tc \leq 200$;

wherein Tc is a highest temperature (°C.) during the curing process and said Tc satisfies the following equation:

$$60 \leq Tc \leq 200;$$

tc is a retention time (min) at the highest temperature and said tc satisfies the following equation:

$$1 \leq tc \leq 120$$

and

Tg is a glass transition temperature of the epoxy resin composition after a lapse of tc (min) at Tc (°C.).

2. An epoxy resin composition according to claim 1, wherein the aromatic epoxy resin has at least a tri-functionality.

3. An epoxy resin composition according to claim 2, wherein an amount of the aromatic epoxy resin having at least a tri-functionality is about 50–100% by weight of the total amount of the epoxy resin.

4. An epoxy resin composition according to claim 2, wherein a viscosity of the aromatic epoxy resin having at least a tri-functionality at 25° C. is within the range of from about 1 to 3,000 Pas.

5. An epoxy resin composition according to claim 1, wherein a viscosity of the epoxy resin composition 5 minutes after mixing the epoxy resin composition at 25° C. is within the range of from about 1 to 1,000 mPa sec.

6. An epoxy resin composition according to claim 1, wherein a tensile modulus of elasticity of a cured resin product produced from the epoxy resin composition is within the range of from about 3.2 to 5 GPa at 23° C.

7. An epoxy resin composition according to claim 1 which satisfies the following equations (2) and (3):

$$1 \leq \eta_{60} \leq 1500 \quad (2)$$

$$1 \leq \eta_{60}/\eta_5 \leq 3 \quad (3)$$

wherein $\eta_5$ is the viscosity (mPa sec) of the epoxy resin composition at 25° C. after the main agent and the curing agent are mixed and allowed to stand for 5 minutes at 25° C. and $\eta_{60}$ is the viscosity (mPa sec) of the epoxy resin composition at 25° C. after the main agent and the curing agent are mixed and allowed to stand for 60 minutes at 25° C.

8. An epoxy resin composition according to claim 1 which satisfies the following equations (2') and (3'):

$$1 \leq \eta_{240} \leq 1000 \quad (2')$$

$$1 \leq \eta_{240}/\eta_5 \leq 3 \quad (3')$$

wherein $\eta_5$ is the viscosity (mPa sec) of the epoxy resin composition at 25° C. after the main agent and the curing agent are mixed and allowed to stand for 5 minutes at 25° C. and $\eta_{240}$ is the viscosity (mPa sec) of the epoxy resin composition at 25° C. after the main agent and the curing agent are mixed and allowed to stand for 240 minutes at 25° C.

9. An epoxy resin composition according to claim 1, further comprising a glycidyl ether type aliphatic epoxy resin having at least a di-functionality.

10. An epoxy resin composition according to claim 9, wherein the glycidyl ether type aliphatic epoxy resin satisfies the following equation (4):

$$0 \leq \alpha \leq 4 \quad (4)$$

wherein $\alpha$ is a number of atoms which do not belong to a ring in a molecular chain produced by linking any two glycidyl oxy groups in a glycidyl ether type aliphatic epoxy resin having at least a di-functionality.

11. An epoxy resin composition according to claim 9 wherein the glycidyl ether type aliphatic epoxy resin having at least a di-functionality is about 1–50% by weight based on the total amount of the epoxy resin.

12. An epoxy resin composition according to claim 1, wherein the viscosity of the aromatic amine compound at 25° C. is within the range of from about 1 to 3000 mPa sec.

13. An epoxy resin composition according to claim 1, wherein the viscosity of the alicyclic amine compound at 25° C. is within the range of from 1 to 500 mPa sec.

14. An epoxy resin composition according to claim 1, wherein the alicyclic amine compound satisfies the following equation (5):

$$0 \leq \beta \leq 4 \quad (5)$$

wherein, $\beta$ is a number of atoms which do not belong to a ring in a molecular chain produced by linking any two amino groups in an alicyclic amine compound.

15. An epoxy resin composition according to claim 1, wherein the alicyclic amine compound contains an amino group bonded to a secondary or tertiary carbon atom.

16. An epoxy resin composition according to claim 15, wherein each of the amino group in the molecule of the alicyclic amine compound is bonded to a secondary or tertiary carbon atoms.

17. An epoxy resin composition for a fiber reinforced composite material comprising the epoxy resin composition according to any one of claim 1 to claim 16.

18. A fiber reinforced composite material comprising a reinforcing fiber and a cured product of the epoxy resin composition according to any one of claim 1 to claim 16.

19. A fiber reinforced composite material according to claim 18, wherein the reinforcing fiber is carbon fiber.

* * * * *